UNITED STATES PATENT OFFICE.

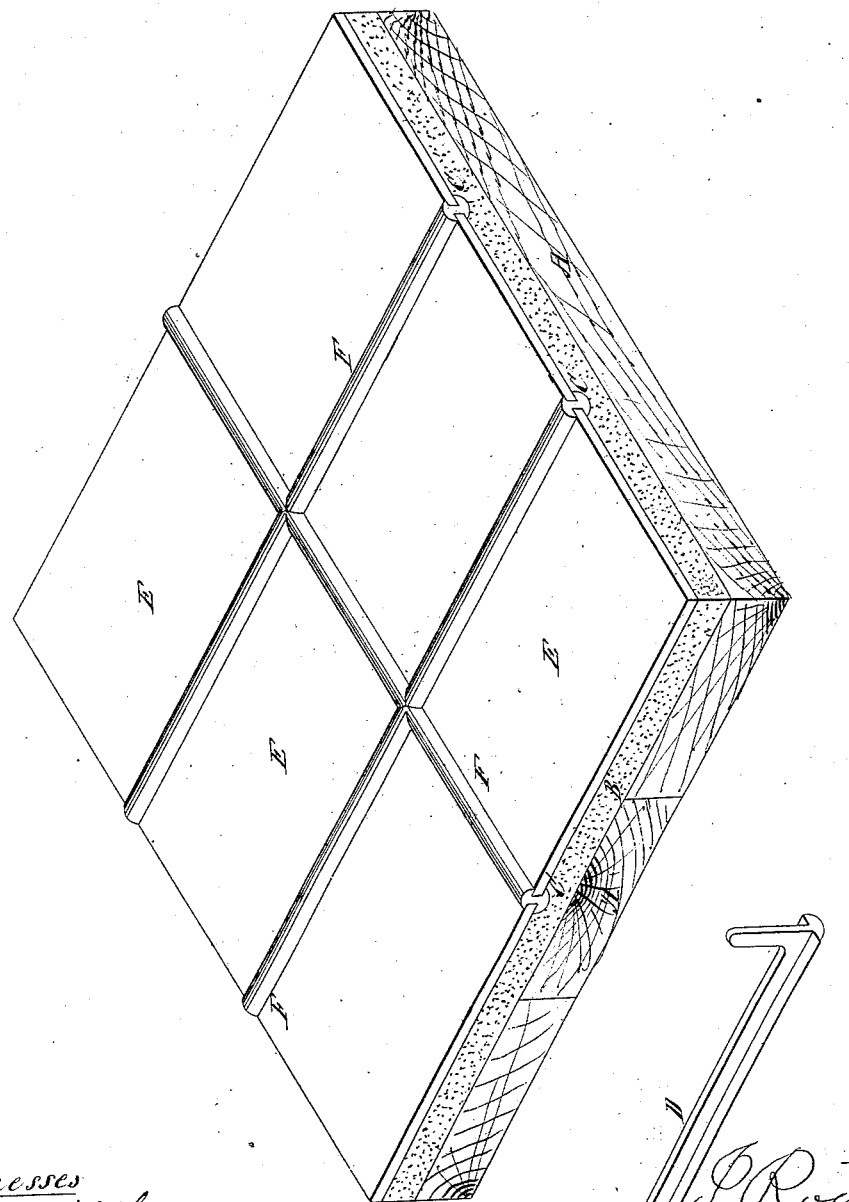

JOSEPH RODEFER, OF CINCINNATI, OHIO.

IMPROVEMENT IN ROOFS.

Specification forming part of Letters Patent No. 44,821, dated October 25, 1864.

*To all whom it may concern:*

Be it known that I, JOSEPH RODEFER, of Cincinnati, Hamilton county, Ohio, have invented a new and useful Improvement in Roofing; and I do hereby declare the following to be a full, true, and exact description thereof, reference being had to the accompanying drawing, making part of this specification.

My invention relates to a certain mode of combining slate or tile with a cement or concrete bed so as to form a cheap and desirable roof.

The accompanying drawing represents a portion of a roof formed on my plan.

A represents a portion of common wooden sheathing.

B represents a bed of concrete or hydraulic cement, or even common mortar, about three-eighths to three-quarters of an inch thick.

I have found in practice the following to form a suitable composition for the bed, namely: Take two parts unslaked lime, or one part hydraulic cement, and combine therewith eight parts of sand and loam, adding water sufficient to make a strong mortar.

The bed B being laid, I form gutters C in its upper surface, in lines immediately coincident with the joining edges of the slates or tiles. These gutters may be formed either by the point of a trowel or other rounded instrument, or by a bar, D, made specially for the purpose.

The slates or tiles E, before being placed upon the bed B, have their edges coated with the following composition, namely: hydraulic cement, one part; fine brick-dust, four parts; and sufficient coal (or other) tar to reduce the mixture to the consistence of paint. This listing or coating the edges of the slates I find to be absolutely essential to a perfect adhesion of the latter to the luting composition—namely, one part lime, six parts fine brick-dust, and as much coal (or other) pitch as will make a mixture that will remain solid at all temperatures below 150° Fahrenheit. I may state that I have found six parts of common coal-pitch a good proportion. A half quantity of hydraulic cement may be used in place of of the lime. The luting F is melted over a fire and poured in between the slates, so as to fill the gutters C, and, rising up between the slates, to slightly overflow their top surface, as shown in the drawing.

The work is best performed after the morning dew is off, and if the atmosphere be frosty it is found preferable to pre heat the slates in order to insure a perfect junction of the luting.

I claim herein as new and of my invention—

The mode of constructing a roof with slates or tiles secured upon a concrete or mortar bed, B, by means of gutters C and luting F, in the manner set forth.

In testimony of which invention I hereunto set my hand.

JOSEPH RODEFER.

Witnesses:
GEO. H. KNIGHT,
JAMES H. LAYMAN.